US005746871A

United States Patent [19]

Walsh

[11] Patent Number: 5,746,871

[45] Date of Patent: May 5, 1998

[54] METHOD FOR FORMING CARTON BLANKS

[75] Inventor: Joseph Christopher Walsh, Longmont, Colo.

[73] Assignee: Graphic Packaging Corporation, Paoli, Pa.

[21] Appl. No.: 513,289

[22] Filed: Aug. 10, 1995

[51] Int. Cl.[6] .......... B32B 31/00

[52] U.S. Cl. .......... 156/268; 156/250; 156/254; 156/257; 156/263; 229/75; 229/76; 229/800; 229/117.01; 383/127; 383/38

[58] Field of Search .......... 156/353, 356, 156/360, 361, 390, 252, 250, 159, 254, 257, 263, 267, 268; 229/17, 37 R, 3.5, 75, 76, 800, 117.01, 117.05, 120, 186; 383/906, 38, 78, 109, 127

[56] References Cited

U.S. PATENT DOCUMENTS

| | | | |
|---|---|---|---|
| 3,434,906 | 3/1969 | Greeve et al. | 156/580 |
| 4,691,858 | 9/1987 | Peer, Jr. | 206/621.2 |
| 4,795,513 | 1/1989 | Jensen, Jr. | 156/108 |
| 4,808,363 | 2/1989 | Walsh et al. | 264/288.4 |
| 5,108,355 | 4/1992 | Walsh | 493/89 |
| 5,224,919 | 7/1993 | Walsh | 493/89 |

*Primary Examiner*—Merrick Dixon

*Attorney, Agent, or Firm*—Klaas, Law, O'Meara & Malkin, P.C.; Joseph J. Kelly

[57] ABSTRACT

A method for forming carton blanks from a continuous laminate having at least a layer of a relatively rigid material and a layer of a relatively flexible fluid impervious material by dividing the continuous laminate into individual carton blanks and at the same time making modified cut lines and fold lines in the individual carton blanks to form top and bottom panel portions, sidewall panel portions and a glue tab panel portion, wherein the modified cut lines extend through the relatively rigid material but not through the relatively flexible fluid impervious material and then removing only the relatively rigid material at various locations to leave the desired carton blank. In some instances, the laminate will contain continuous strips of a relatively flexible material between the relatively rigid material and the relatively flexible fluid impervious material and secured only to the relatively flexible fluid impervious material.

20 Claims, 2 Drawing Sheets

METHOD FOR FORMING CARTON BLANKS

FIELD OF THE INVENTION

This invention relates generally to the formation of carton blanks and more specifically to the formation of carton blanks from a continuous laminate having at least a paperboard layer and a fluid impervious layer.

BACKGROUND OF THE INVENTION

In the manufacturing of carton blanks from a continuous web of material, it is customary to cut the continuous web into individual carton blanks and at the same time to cut the individual carton blank to form top and bottom panel portions. In some instances, the continuous web of material is a laminate of a paperboard material and a fluid impervious material and wherein the fluid impervious material is not secured to the paperboard material at locations for forming top and bottom panel portions in the paperboard material. Therefore, it is desirable to form the top and bottom panel portions in the paperboard material but not in the fluid impervious material.

BRIEF DESCRIPTION OF THE INVENTION

This invention provides a method for forming carton blanks from a continuous laminate of at least a layer of a relatively rigid material and a layer of a relatively flexible fluid impervious material wherein modified cut lines in the individual carton blank extend through the layer of the relatively rigid material but do not damage the integrity of the layer of the relatively flexible fluid impervious material.

In a preferred embodiment of the invention, a continuous laminate of a relatively rigid material, such as a paperboard, and a relatively flexible fluid impervious material, such as polypropylene or a kraft paper coated with polyethylene or other materials having similar characteristics, is divided into individual carton blanks and each individual carton blank is provided with modified cut lines and vonventional fold lines to define sidewall panel portions, a glue tab panel portion and top and bottom panel portions. The modified cut lines, are formed in the individual carton blanks, which modified cut lines extend through the relatively rigid material but not through the relatively flexible fluid impervious material. In some instances, the modified cut lines can extend into but not through the relatively flexible fluid impervious material. The modified cut lines form top and bottom panel portions and other portions that are removed from the carton blank. In one embodiment, the portions of the relatively rigid material to be removed and the portion of the relatively flexible fluid impervious material associated therewith are pierced by a hook so that, when the hook is withdrawn, the portions of the relatively rigid material move with the hook. This embodiment leaves a hole in the relatively flexible fluid impervious material but it is at a location that is later sealed during the filling of the carton formed from the carton blank. In another embodiment of the invention, an extension portion is located between the bottom panel portions of one carton blank and the top panel portion of an adjacent carton blank or can project outwardly from either the top panel portions or the bottom panel portions. Various cut lines, explain below, are made so that, when removing the portions of the relatively rigid material, the extension portion is pierced by the hook and, when the hook is removed, the extension portion, the portion of the relatively flexible fluid impervious material below the exterior portion and the portions of the relatively rigid material move with the hook.

In another preferred embodiment of the invention, continuous strips of a relatively flexible material, such as a kraft paper, are located between portions of the relatively rigid material and portions of the relatively flexible fluid impervious material and are secured to the relatively flexible fluid impervious material. As described above, when the continuous laminate is cut into individual carton blanks, modified cut lines are formed in the individual carton blanks which modified cut lines extend through the relatively rigid material but not through the strips of a relatively flexible material and the relatively flexible fluid impervious material. In some instances, the modified cut lines can extend at least partially through the relatively flexible material and, if the relatively flexible fluid impervious material is thick enough, the modified cut line can extend through the relatively flexible material and into but not through the relatively flexible fluid impervious material.

BRIEF DESCRIPTION OF THE DRAWING

Illustrative embodiments of the invention are shown in the accompanying drawing in which.

DETAILED DESCRIPTION OF THE INVENTION

Figure 1:
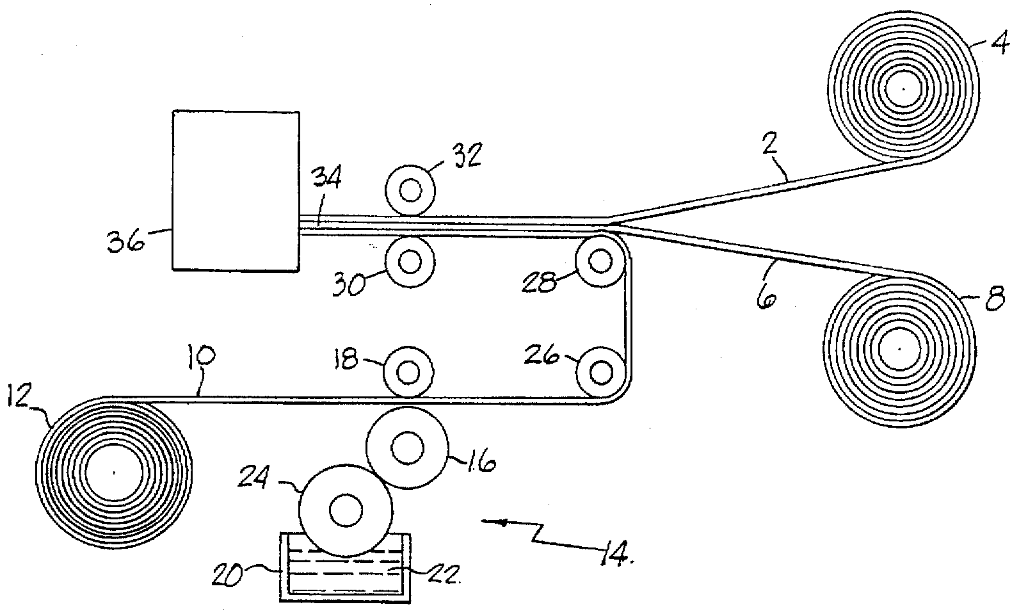
FIG. 1 is a schematic illustration of apparatus for forming a continuous laminate.

In FIG. 1, there is a schematic illustration of apparatus for forming a continuous laminate for use in making carton blanks. A continuous web 2 of a relatively rigid material, such as paperboard, is pulled from the roll 4. A plurality of continuous strips 6 of a relatively flexible material, such as kraft paper, are pulled from the roll 8 and are positioned at spaced apart locations beneath the continuous web 2 of a relatively rigid material for movement therewith.

A continuous film 10 of a relatively flexible fluid impervious material, such as a plastic material such as polypropylene or a kraft paper coated with a plastic material such as polyethylene or other materials having similar characteristics, is pulled from the roll 12 and fed into an adhesive coating station 14. The continuous film 10 is fed between a driven gravure roll 16 having at least one raised surface and an idler pressure applying roll 18. A supply tank 20 is mounted at a fixed location and holds a supply of a suitable adhesive material 22. A transfer roll 24 is rotatably mounted to pass through the adhesive material 22 and then to contact the raised surfaces of the gravure roll 16 to coat them with the adhesive material 22. The coated continuous film 10 passes over guide rollers 26 and 28. The coated continuous film 10, the strips 6 and the continuous web 2 pass between a drive roll 30 and a pressure applying idler roll 32 to secure the continuous strips 6 to the coated continuous film 10 and the portions of the continuous web 2 of a relatively rigid material between the strips 6 to the continuous film 10. It is noted that the gravure roll 16 applies the adhesive coating to the bottom surface of the continuous film 10 and the guide rollers 26 and 28 function to invert the continuous film 10 so that the bottom surface becomes the top surface as the continuous film 10 passes between the drive roll 30 and the pressure applying idler roll 32. The continuous laminated product 34 is then fed into conventional apparatus 26 for further processing. Although a gravure roll is preferred, it is understood that other types of rolls can be used to apply the adhesive material to the continuous film 10.

Figure 2:
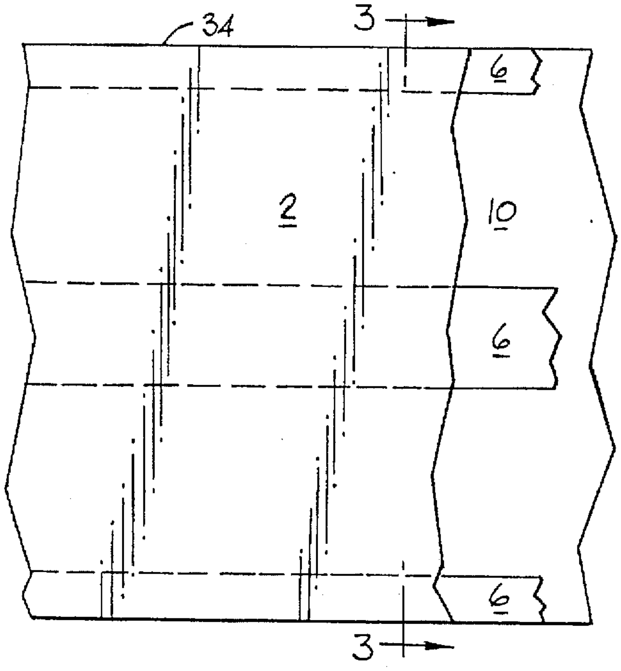
FIG. 2 is a top plan view with portions broken away of a portion of the continuous laminate.
Figure 3:
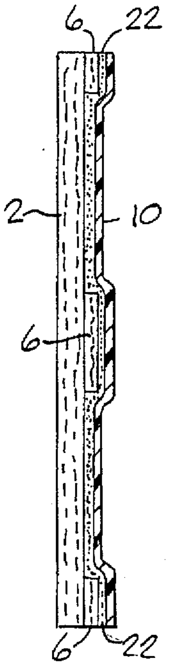
FIG. 3 is a cross-sectional view taken on the line 3—3 of FIG. 2 of one embodiment of the continuous laminate.

In FIGS. 2 and 3, there is illustrated a portion of the continuous laminate 34 having the lamination of the continuous web 2 of a relatively rigid material, the plurality of strips 6 of a relatively flexible material, the adhesive material 22 and the continuous film 10 of a relatively flexible fluid impervious material. The middle continuous strip 6 of the relatively flexible material is twice as wide as the edge continuous strips 6 so that two carton blanks can be formed therefrom. The number of the wider continuous strips 6 depend on the number of carton blanks in a cross machine direction that are to be formed from the continuous laminate 34.

Figure 4:
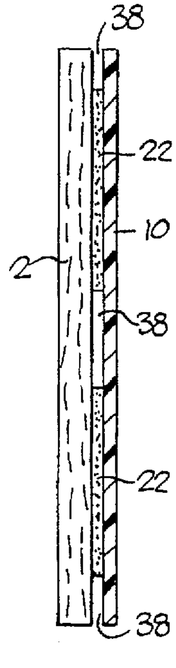
FIG. 4 is a cross-sectional view taken on the line 3—3 of FIG. 2 of another embodiment of the continuous laminate.

In FIG. 4, there is illustrated another continuous laminate in which the continuous strips 6 of a relatively flexible material have not been inserted. The gravure roll 16 is formed with two circumferentially extending raised surfaces (not shown) to provide for two continuous spaced apart rows of adhesive material 22. The blank spaces 38 are those were the continuous strips 6 of a relatively flexible material would be.

Figure 5:
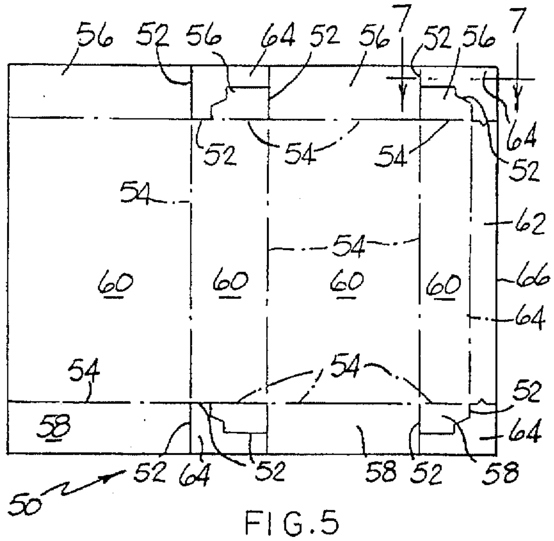
FIG. 5 is a top plan view of an individual carton blank having modified cut lines and fold lines formed thereon.
Figure 6:
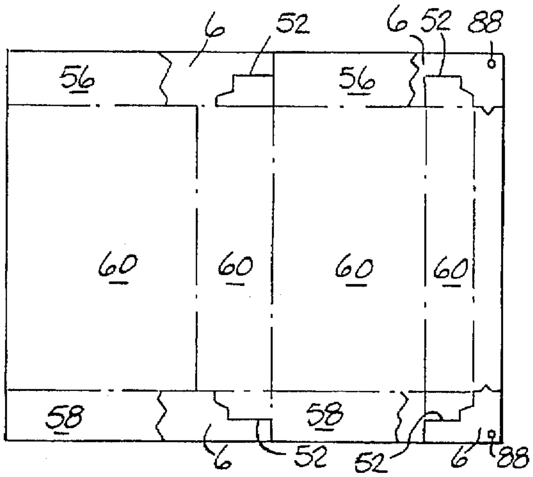
FIG. 6 is a top plan view illustrating an individual carton blank after portions of the relatively rigid material have been removed.

An individual carton blank 50 is illustrated in FIG. 5 and has a plurality of modified cut lines 52 and fold lines 54 formed in the relatively rigid material 2 to divide the relatively rigid material 2 with a plurality of top panel portions 56, a plurality of bottom panel portions 58, a plurality of sidewall panel portions 60 and a glue tab panel portion 62. In FIG. 6, the portions 64 of the relatively rigid material 2 defined by some of the modified cut lines 52 have been removed.

Figure 7:
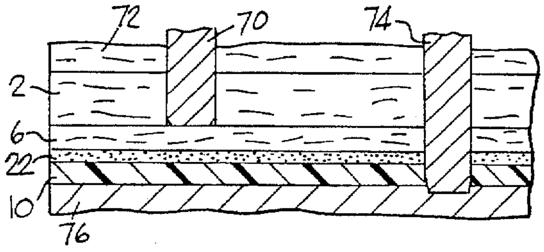
FIG. 7 is a view in cross-section illustrating the formation of different types of cut lines.

FIG. 7 is an enlarged cross-sectional view taken on the line 7—7 of FIG. 5 and illustrates the cutting of the modified cut lines 52 in the carton blank 50 formed as illustrated in FIG. 3 and the cut line 66 between adjacent carton blanks 50 of the continuous laminate 34. The cutting apparatus is similar to that illustrated in FIG. 3 of U.S. Pat. No. 4,963,126 which is incorporated herein by reference thereto. A cutting rule 70 passes through an opening in the resilient material 72, such as the rubberized block 18 in the '126 patent, and cuts through the continuous web 2 of the relatively rigid material but preferably does not cut the continuous strip 6 of the relatively flexible material. However, in some instances the cutting rule 70 can extend into the continuous strip 6 of the relatively flexible material. If the continuous film 10 is thick enough, the cutting rule 70 can cut through the continuous strip 6 of a relatively flexible material and partially into the continuous film 10 as long as the integrity of the continuous film 10 is maintained. Another cutting rule 74 passes through an opening in the resilient material 72 and cuts through the continuous web 2 of the relatively rigid material, the continuous strip 6 of the relatively flexible material, the adhesive 22 and the continuous film 10 of the relatively flexible fluid impervious material. A lower platen 76, similar to the lower platen 22 in the '126 patent supports the continuous laminate 34 during the cutting operations.

Figure 8:
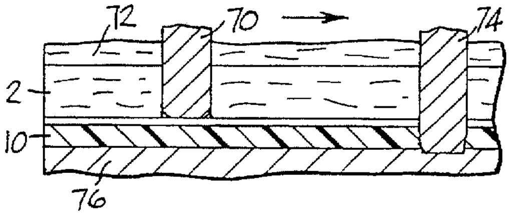
FIG. 8 is a view in cross-section illustrating the formation of different types of cut lines.

The cutting apparatus illustrated in FIG. 8 is used to cut a continuous laminate 34 of the type illustrated in FIG. 4. The cutting rule 70 cuts through the continuous web 2 of the relatively rigid material but preferably does not cut into the continuous film 10 of the relatively flexible fluid impervious material. However, if the continuous film 10 of the relatively flexible fluid impervious material is thick enough the cutting rule 70 may extend partially into the continuous film 10 of the relatively flexible fluid impervious material. The cutting rule 74 cuts through the continuous web 2 of the relatively rigid material and the continuous film 10 of the relatively flexible fluid impervious material.

Figure 9:
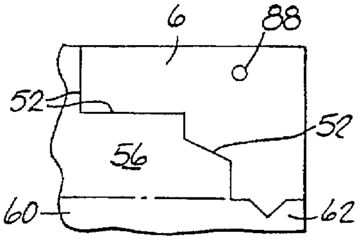
FIG. 9 is a top plan view of an individual carton blank after a portion has been removed.
Figure 10:
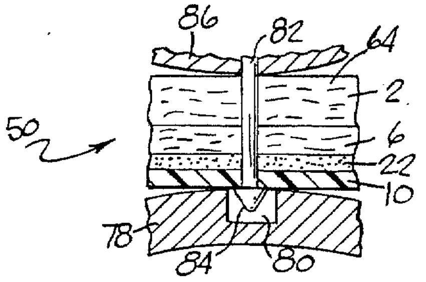
FIG. 10 is a schematic view in cross-section of apparatus for removing a portion of an individual carton blank.

An enlarged portion of the upper right hand corner of FIG. 6 is illustrated in FIG. 9. A method for removing the portion 64 from the upper right hand portion of FIG. 5 is illustrated in FIG. 10. A cut carton blank 50 is moved over a supporting roller 78 having a plurality of cavities 80 formed therein. A plurality of pistons 82, each having a hook shaped head portion 84, are mounted for extension from a roller 86 and each is passed through the relatively rigid material 2, the relatively flexible material 6, the adhesive 22 and the continuous film 10 of the relatively flexible fluid impervious material and into the cavity 80. As the rollers 78 and 86 rotate, the hook shaped head portion 84 moves outwardly and pulls the removable portion 64 with it. An opening 88 is formed in the relatively flexible material 6, the adhesive 22 and the continuous film 10 of a relatively flexible fluid impervious material but such opening is sealed when the carton formed from the carton blank 50 is being filled and sealed.

Figure 11:
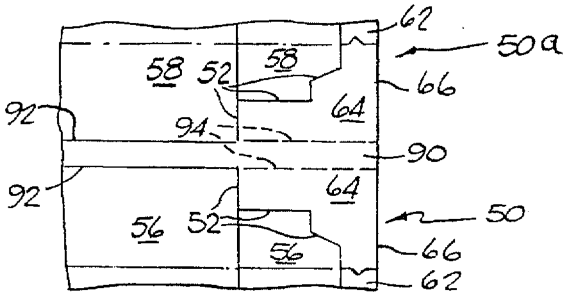
FIG. 11 is a top plan view of a portion of successive carton blanks prior to the removal of a portion thereof.
Figure 12:
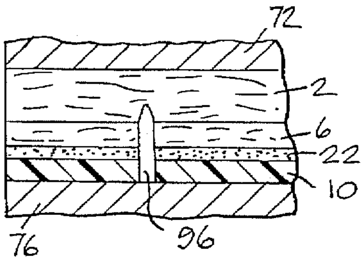
FIG. 12 is a schematic view in cross-section illustrating apparatus for forming a cut line in a carton blank.

In some instances, it may be desirable not to leave an opening 88. A method for doing this is illustrated in FIGS. 11 and 12. An extension 90 is formed between the top panel portions 56 of one carton blank 50 and the bottom panel portions 58 of an adjacent carton blank **50*a*. The extension 90 comprises a laminate of the relatively rigid material, the relatively flexible material and the relatively flexible fluid impervious material. Cut lines 92 and 94 define the extension 90. Cut lines 92 extend through the relatively rigid material 2, the relatively flexible material 6, the adhesive 22 and the continuous film 10 of the relatively flexible fluid impervious material. Cut lines 52 are made as described above so that portion 64 can be removed. Cut lines 94 extend upwardly through the relatively flexible fluid impervious material 10, the adhesive 22, the relatively flexible material 6 and partially into the relatively rigid material 2. As illustrated in FIG. 12, cut line 94 is made by a cutting rule 96 extending from the lower platen 76 and passing through the film 10 of a relatively flexible fluid impervious material, the adhesive layer 22 and the relatively flexible material 6 but not through the relatively rigid material 2. Therefore, when the hook shaped head portion 84 is passed through the extension 90 and pulled out, the extension 90 and the relatively flexible material 6, the adhesive 22 and the film 10 of a relatively flexible fluid impervious material directly below it and the removable portions 64 are removed. If the carton blank 50 is the end carton blank then the extension 90 will have a width that is only half of that shown in FIG. 11. The apparatus illustrated in FIG. 10 will be located below a vacuum head (not shown) to carry away the removed portions 64**.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed:

1. A method for forming a carton blank from a continuous laminate comprising at least a layer of a relatively rigid material and a layer of a relatively flexible fluid impervious material adhered to at least portions of said relatively rigid material comprising:

dividing said continuous laminate into individual carton blanks;

making modified cut lines and fold lines in said individual carton blanks to form in said relatively rigid material top and bottom panel portions, sidewall panel portions, a glue tab panel portion, and removable portions of said relatively rigid material;

extending said modified cut lines through said relatively rigid material but not through said relatively flexible fluid impervious material; and removing only said removable portions of said relatively rigid material at various locations defined by said modified cut lines so as to leave a desired carton blank.

2. A method as in claim 1 and further comprising:

making said modified cut lines at various locations to extend through said relatively rigid material and partially into said relatively flexible fluid impervious material while maintaining the integrity of said relatively flexible fluid impervious material.

3. A method as in claim 1 wherein:

said continuous laminate further comprises a layer of a relatively flexible material between portions of said relatively rigid material and said relatively fluid impervious material and secured to said relatively flexible fluid impervious material comprising:

making said modified cut lines at various locations through said relatively rigid material but not through said relatively flexible material; and removing only said removable portion of said relatively rigid material at said various locations.

4. A method as in claim 3 and further comprising:

making said modified cut lines at various locations to extend through said relatively rigid material and through said relatively flexible material but not through said relatively flexible fluid impervious material.

5. A method as in claim 4 and further comprising:

making said modified cut lines at various locations to extend through said relatively rigid material and said relatively flexible material and partially into said relatively flexible fluid impervious material while maintaining the integrity of said relatively flexible fluid impervious material.

6. A method as in claim 1 wherein said step of removing only said relatively rigid material at said various locations comprises:

piercing said relatively rigid material and said relatively flexible fluid impervious material with a piston having a hook shaped head portion;

removing said hook shaped head portion and during the movement thereof contacting at least portions of said relatively rigid material with said hook shaped head portion to remove said removable portions of said relatively rigid material at said various locations; and leaving an opening in said relatively flexible fluid impervious material.

7. A method as in claim 2 wherein said step of removing only said relatively rigid material at said various locations comprises:

piercing said relatively rigid material and said relatively flexible fluid impervious material with a piston having a hook shaped head portion;

removing said hook shaped head portion and during the movement thereof contacting at least portions of said relatively rigid material with said hook shaped head portion to remove said removable portions of said relatively rigid material at said various locations; and leaving an opening in said relatively flexible fluid impervious material.

8. A method as in claim 3 wherein said step of removing only said relatively rigid material at said various locations comprises:

piercing said relatively rigid material, said relatively flexible material and said relatively flexible fluid impervious material with a piston having a hook shaped head portion;

removing said hook shaped head portion and during the movement thereof contacting at least portions of said relatively rigid material with said hook shaped head portion to remove said removable portions of said relatively rigid material at said various locations; and leaving an opening in said relatively flexible material and said relatively flexible fluid impervious material.

9. A method as in claim 4 wherein said step of removing only said relatively rigid material at said various locations comprises:

piercing said relatively rigid material, said relatively flexible material and said relatively flexible fluid impervious material with a piston having a hook shaped head portion;

removing said hook shaped head portion and during the movement thereof contacting at least portions of said relatively rigid material with said hook shaped head portion to remove said removable portions of said relatively rigid material at said various locations; and leaving an opening in said relatively flexible material and said relatively flexible fluid impervious material.

10. A method as in claim 5 wherein said step of removing only said relatively rigid material at said various locations comprises:

piercing said relatively rigid material, said relatively flexible material and said relatively flexible fluid impervious material with a piston having a hook shaped head portion;

removing said hook shaped head portion and during the movement thereof contacting at least portions of said relatively rigid material with said hook shaped head portion to remove said removable portions of said relatively rigid material at said various locations; and leaving an opening in said relatively flexible material and said relatively flexible fluid impervious material.

11. A method as in claim 1 wherein said continuous laminate includes an extension portion located between the top panel portions of one of said individual carton blanks and the bottom panel portions of an adjacent one of said individual carton blanks and further comprising:

making cut lines between said extension portion and said top and bottom panel portions at spaced apart locations so that said cut lines extend through said relatively rigid material and through said relatively flexible fluid impervious material;

making additional cut lines extending through said relatively flexible fluid impervious material but not through said relatively rigid material at locations between said various locations;

piercing said extension portion with a piston having a hook shaped head portion so that said hook shaped head portion extends through said relatively rigid material and said relatively flexible fluid impervious material; and removing said hook shaped head portion and during the removal thereof contacting at least portions of said extension portion with said hook shaped head portion to remove said relatively rigid material and said relatively flexible fluid impervious material of said extension portion and said removable portions of said relatively rigid material at said various locations.

12. A method as in claim 2 wherein said continuous laminate includes an extension portion located between the top panel portions of one of said individual carton blanks and the bottom panel portions of an adjacent one of said individual carton blanks and further comprising:

making cut lines between said extension portion and said top and bottom panel portions at spaced apart locations so that said cut lines extend through said relatively rigid material and through said relatively flexible fluid impervious material;

making additional cut lines extending through said relatively flexible fluid impervious material but not through said relatively rigid material so that said cut lines extend through said relatively rigid material and through said relatively flexible fluid impervious material;

piercing said extension portion with a piston having a hook shaped head portion so that said hook shaped head portion extends through said relatively rigid material and said relatively flexible fluid impervious material; and removing said hook shaped head portion and during the removal thereof contacting at least portions of said extension portion with said hook shaped head portion to remove said relatively rigid material and said relatively flexible fluid impervious material of said extension portion and said removable portions of said relatively rigid material at said various locations.

13. A method as in claim 3 wherein said continuous laminate includes an extension portion located between the top panel portions of one of said individual carton blanks and the bottom panel portions of an adjacent one of said individual carton blanks and further comprising:

making conventional cut lines between said extension portion and said top and bottom panel portions at spaced apart locations so that said cut lines extend through said relatively rigid material, said relatively flexible material and said relatively flexible fluid impervious material;

making additional cut lines extending through said relatively flexible fluid impervious material and said relatively flexible material but not through said relatively rigid material at locations between said various locations;

piercing said extension portion with a piston having a hook shaped head portion so that said hook shaped head portion extends through said relatively rigid material, said relatively flexible material and said relatively flexible fluid impervious material; and removing said hook shaped head portion and during the removal thereof contacting at least portions of said extension portion with said hook shaped head portion to remove said relatively rigid material, said relatively flexible material of said extension portion and said relatively flexible fluid impervious material of said extension portion and said removable portions of said relatively rigid material at said various locations.

14. A method as in claim 4 wherein said continuous laminate includes an extension portion located between the top panel portions of one of said individual carton blanks and the bottom panel portions of an adjacent one of said individual carton blanks and further comprising:

making cut lines between said extension portion and said top and bottom panel portions at spaced apart locations so that said cut lines extend through said relatively rigid material, said relatively flexible material and said relatively flexible fluid impervious material;

making additional cut lines extending through said relatively flexible fluid impervious material and said relatively flexible material but not through said relatively rigid material at locations between said various locations;

piercing said extension portion with a piston having a hook shaped head portion so that said hook shaped head portion extends through said relatively rigid material, said relatively flexible material and said relatively flexible fluid impervious material; and removing said hook shaped head portion and during the removal thereof contacting at least portions of said extension portion with said hook shaped head portion to remove said relatively rigid material, said relatively flexible material and said relatively flexible fluid impervious material of said extension portion and said removable portions of said relatively rigid material at said various locations.

15. A method as in claim 5 wherein said continuous laminate includes an extension portion located between the top panel portions of one of said individual carton blanks and the bottom panel portions of an adjacent one of said individual carton blanks and further comprising:

making cut lines between said extension portion and said top and bottom panel portions at spaced apart locations so that said cut lines extend through said relatively rigid material, said relatively flexible material and said relatively flexible fluid impervious material;

making additional cut lines extending through said relatively flexible fluid impervious material and said relatively flexible material but not through said relatively rigid material at locations between said various locations;

piercing said extension portion with a piston having a hook shaped head portion so that said hook shaped head portion extends through said relatively rigid material, said relatively flexible material and said relatively flexible fluid impervious material; and removing said hook shaped head portion and during the removal thereof contacting at least portions of said extension portion with said hook shaped head portion to remove said relatively rigid material, said relatively flexible material and said relatively flexible fluid impervious material of said extension portion and said removable portions of said relatively rigid material at said various locations.

16. A method as in claim 1 wherein said continuous laminate includes an extension portion extending outwardly from either the top panel portions or the bottom panel portions of said individual carton blank and further comprising:

making cut lines between said extension portion and said top or bottom panel portions at spaced apart locations so that said cut lines extend through said relatively rigid material and through said relatively flexible fluid impervious material;

making additional cut lines extending through said relatively flexible fluid impervious material but not through said relatively rigid material at locations between said various locations;

piercing said extension portion with a piston having a hook shaped head portion so that said hook shaped head portion extends through said relatively rigid material and said relatively flexible fluid impervious material; and removing said hook shaped head portion and during the removal thereof contacting at least portions of said extension portion with said hook shaped head portion to remove said relatively rigid material and said relatively flexible fluid impervious material of said extension portion and said removable portions of said relatively rigid materials at said various locations.

17. A method as in claim 2 wherein said continuous laminate includes an extension portion extending outwardly form either the top panel portions or the bottom panel portions of said individual carton blank and further comprising:

making cut lines between said extension portion and said top or bottom panel portions at spaced apart locations so that said cut lines extend through said relatively rigid material and through said relatively flexible fluid impervious material;

making additional cut lines extending through said relatively flexible fluid impervious material but not through said relatively rigid material so that said cut lines extend through said relatively rigid material and through said relatively flexible fluid impervious material;

piercing said extension portion with a piston having a hook shaped head portion so that said hook shaped head portion extends through said relatively rigid material and said relatively flexible fluid impervious material; and removing said hook shaped head portion and during the removal thereof contacting at least portions of said extension portion with said hook shaped head portion to remove said relatively rigid material and said relatively flexible fluid impervious material of said extension portion and said removable portions of said relatively rigid material at said various locations.

18. A method as in claim 3 wherein said continuous laminate includes an extension portion extending outwardly form either the top panel portions or the bottom panel portions of said individual carton blank and further comprising:

making cut lines between said extension portion and said top or bottom panel portions at spaced apart locations so that said cut lines extend through said relatively rigid material, said relatively flexible material and said relatively flexible fluid impervious material;

making additional cut lines extending through said relatively flexible fluid impervious material and said relatively flexible material but not through said relatively rigid material at locations adjacent to said various locations;

piercing said extension portion with a piston having a hook shaped head portion so that said hook shaped head portion extends through said relatively rigid material, said relatively flexible material and said relatively flexible fluid impervious material; and removing said hook shaped head portion and during the removal thereof contacting at least portions of said extension portion with said hook shaped head portion to remove said relatively rigid material, said relatively flexible material and said relatively flexible fluid impervious material of said extension portion and said removable portions of said relatively rigid material at said various locations.

19. A method as in claim 4 wherein said continuous laminate includes an extension portion extend outwardly from the top panel portions or the bottom panel portions of said individual carton blank and further comprising:

making cut lines between said extension portion and said top or bottom panel portions at spaced apart locations so that said cut lines extend through said relatively rigid material, said relatively flexible material and said relatively flexible fluid impervious material;

making additional cut lines extending through said relatively flexible fluid impervious material and said relatively flexible material but not through said relatively rigid material at locations adjacent to said various locations;

piercing said extension portion with a piston having a hook shaped head portion so that said hook shaped head portion extends through said relatively rigid material, said relatively flexible material and said relatively flexible fluid impervious material; and removing said hook shaped head portion and during the removal thereof contacting at least portions of said extension portion with said hook shaped head portion to remove said relatively rigid material, said relatively flexible material and said relatively flexible fluid impervious material of said extension portion and said removable portions of said relatively rigid material at said various locations.

20. A method as in claim 5 wherein said continuous laminate includes an extension portion extending outwardly from either the top panel portions or the bottom panel portions of said individual carton blank and further comprising:

making cut lines between said extension portion and said top or bottom panel portions at spaced apart locations so that said cut lines extend through said relatively rigid material, said relatively flexible material and said relatively flexible fluid impervious material;

making additional cut lines extending through said relatively flexible fluid impervious material and said relatively flexible material but not through said relatively rigid material at locations adjacent to said various locations;

piercing said extension portion with a piston having a hook shaped head portion so that said hook shaped head portion extends through said relatively rigid material, said relatively flexible material and said relatively flexible fluid impervious material; and removing said hook shaped head portion and during the removal thereof contacting at least portions of said extension portion with said hook shaped head portion to remove said relatively rigid material, said relatively flexible material and said relatively flexible fluid impervious material of said extension portion and said removable portions of said relatively rigid material at said various locations.

* * * * *

UNITED STATES PATENT AND TRADEMARK OFFICE

CERTIFICATE OF CORRECTION

PATENT NO. : 5,746,871

DATED : May 5, 1998

INVENTOR(S) : Joseph Christopher Walsh

It is certified that error appears in the above-identified patent and that said Letters Patent is hereby corrected as shown below:

Column 1, Line 37: "vonventional" should read -- conventional--

In the Claims

Claim 17, Column 9, Line 29: "form" should read --from--

Claim 18, Column 9, Line 58: "form" should read --from--

Signed and Sealed this

Twenty-fifth Day of August, 1998

*Attest:*

BRUCE LEHMAN

*Attesting Officer*

*Commissioner of Patents and Trademarks*